May 21, 1935.  S. H. OWENS  2,002,439
MOVABLE ABUTMENT FOR CONTAINER VEHICLES
Original Filed April 28, 1932   2 Sheets-Sheet 1
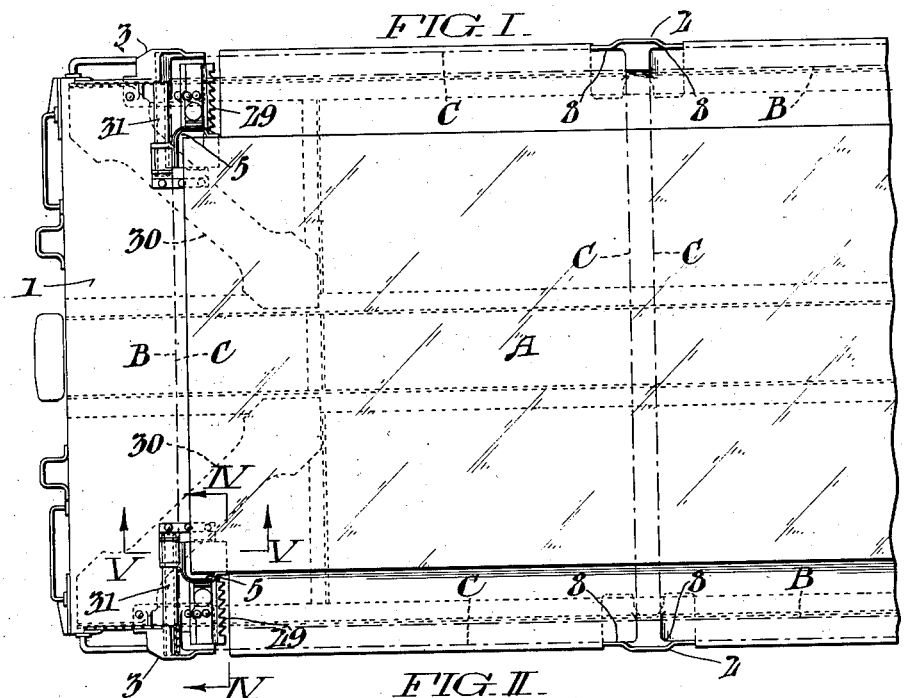
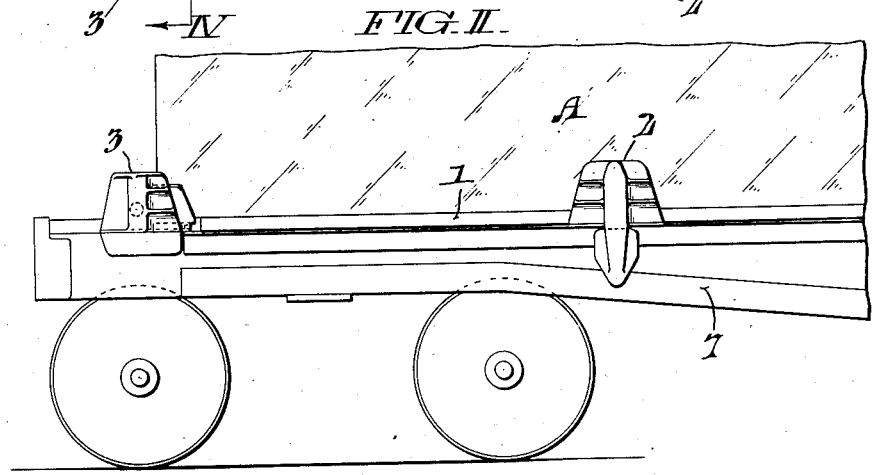
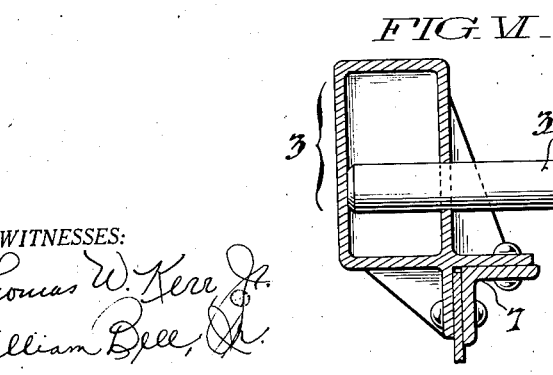
WITNESSES:
INVENTOR:
Samuel H. Owens,
BY
ATTORNEYS.

May 21, 1935. S. H. OWENS 2,002,439
MOVABLE ABUTMENT FOR CONTAINER VEHICLES
Original Filed April 28, 1932 2 Sheets-Sheet 2
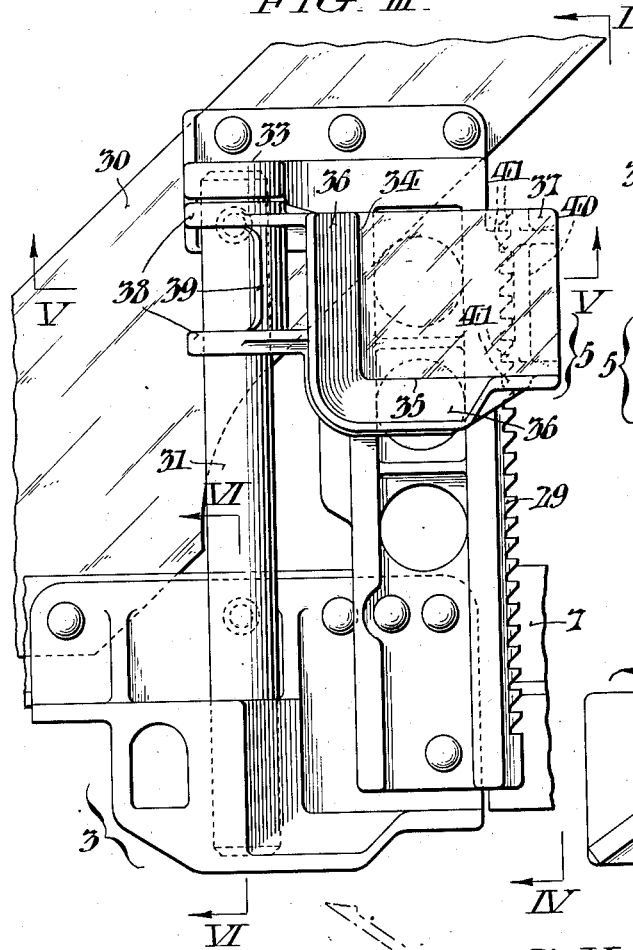
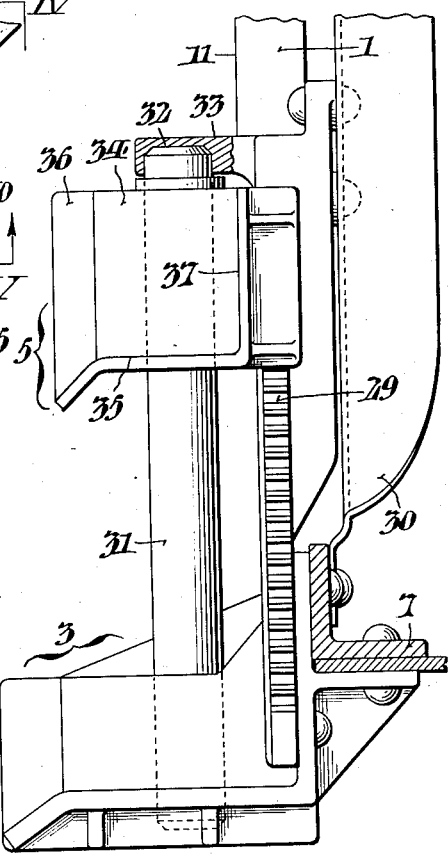
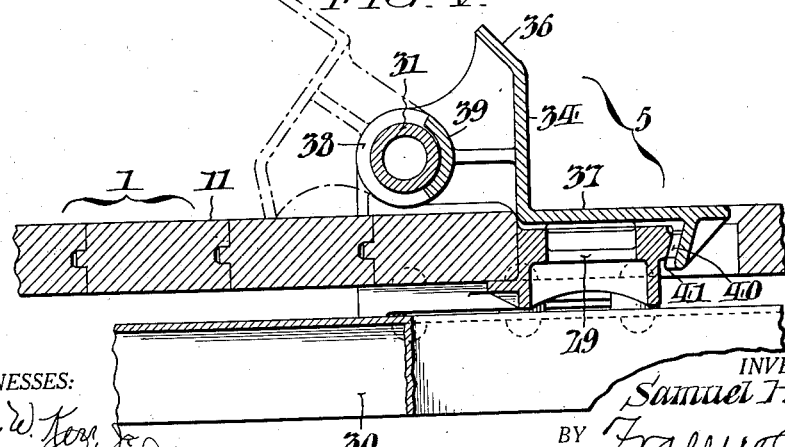
INVENTOR:
Samuel H. Owens,
BY Fraley Paul
ATTORNEYS.

Patented May 21, 1935

2,002,439

UNITED STATES PATENT OFFICE 2,002,439

MOVABLE ABUTMENT FOR CONTAINER VEHICLES

Samuel H. Owens, Altoona, Pa.

Original application April 28, 1932, Serial No. 608,007. Divided and this application April 28, 1932, Serial No. 608,006

5 Claims. (Cl. 105—366)

This invention relates to movable seating abutments for container vehicles, and more particularly to an end corner abutment mounted on the platform of a railway car, motor truck or the like adapted to serve as a seat for a container corner. The present application constitutes a division of my pending application for U. S. Letters Patent, Serial No. 608,007, filed April 28, 1932, in which there is described in detail a complete assemblage of fixed and movable abutments for a railway car whereby the car is adapted for the carrying of railway containers of standard size, and also for the carrying of non-standard containers, such as so called "demountable truck bodies", of varying base dimensions. This invention is directed to the particular fixed and movable container seating abutments which are conveniently employed at the ends of a vehicle platform, and which serve as stops preventing shifting of such containers in transit and as guides facilitating the lowering of containers into place on the vehicle platform.

The object of the invention is to provide in association with a vehicle platform a set of container seating abutments which have capacity for movement inward from the edge of the platform and which are adapted to be locked to the platform at varying distances from the edge thereof, thus serving as seats and guides for containers of varying width.

A more specific object of the invention is to provide, in combination with such movable abutments, fixed end corner abutments for the seating of standard size containers, the two sets of abutments being so disposed that the loading space of the vehicle platform is normally unobstructed and the advantages of rigidly attached seating abutments are had for the normal use with the standard size containers which the vehicle is primarily adapted to carry, whereas a conversion of the vehicle may be readily effected when it is desired to carry thereon containers of less base width than the standard size.

Other more specific objects and advantages characterizing my invention will become more fully apparent from the description hereinafter of one embodiment or example of the practice of the invention, having reference to the accompanying drawings, whereof:

Fig. I represents a plan view of the end of a railway flat car fitted with end corner container abutments of my invention.

Fig. II represents a side elevation of the same.

Fig. III represents an enlarged plan view of combined fixed and movable end corner abutments of the car, with a portion of the floor of the car removed to show the underframe.

Fig. IV represents a side elevation of such end corner abutments, taken as indicated by the lines IV—IV of Fig. III.

Fig. V represents a cross sectional view of such end corner abutments, taken as indicated by the lines V—V of Fig. III; and Fig. VI represents a cross sectional view taken as indicated by the lines VI—VI of Fig. III, showing the interior of one of the fixed end corner abutments.

With particular reference to Figs. I and II, it will be seen that the container vehicle selected for illustration as an example of an embodiment of my invention comprises an ordinary railway flat car with the addition thereon of various types of abutments for defining seats for containers superimposed upon the platform 1 of the vehicle. A portion of a container of the type generally known as a "demountable truck body" is illustrated in diagrammatic outline at A, such container being of less width and greater length than the ordinary railway container.

In Figs. I and II of the drawings there are shown mounted on the platform 1 of the railway car fixed side abutments which are designated at 2, fixed end corner abutments designated at 3, and movable end corner abutments designated at 5. The fixed side abutments 2 together with the fixed end corner abutments 3 define a plurality of rectangular seats along the side edges of the vehicle for accommodation of vehicles of standard dimensions, the car being primarily adapted for car containers of approximately the same width as the width of the car platform 1. The base dimensions of such a standard size container are indicated by the broken lines C. There is also indicated in broken lines at B a long container of the maximum width which can be accommodated by the movable end corner abutments 5. The fixed side abutments 2 in each instance define oppositely directed corners 8 for engagement with adjacent corners of such standard size containers.

The fixed end corner abutments 3 are securely riveted to the side sills 7 as shown in Fig. III, and are each formed and spaced with respect to the fixed side abutments 2 to accommodate a single corner of a standard size container at the end of the car. As clearly shown in Figs. III, IV, and V there extends inward from each fixed end corner abutment 3 toward the center line of the car a rack 29. Each rack 29 is disposed just below the top surface 11 of the car platform 1 with its outer end riveted to the fixed end corner abutment 3 and to the side sill 7 and its inner end riveted to a diagonal stiffening member 30 of the car underframe. Above each rack 29 and in parallel relation therewith there is a shaft 31, the outer end of which is supported by the corresponding fixed end corner casting 3 as shown in Fig. III and the inner end of which is supported in a socket 32 on an upstanding projection 33 of the rack 29.

The movable end corner abutments 5 are mounted for sliding and swinging movement on the shafts 31. Each movable end corner abutment 5 is preferably formed with two upstanding flanges 34 and 35 at right angles to each other having outwardly inclined portions 36 near the top edges which facilitate the guiding of a container into position when it is lowered onto a car platform. Each movable end corner abutment 5 is also formed with a horizontally extending base plate 37 adapted to support a container corner. The upstanding flange 34 is provided with arms 38 connected by a sleeve portion 39 which bears upon the shaft 31, permitting a transverse sliding movement of the abutment 5 across the platform 1 of the car as well as a swinging movement about the axis of the shaft 31. Depending from the base plate 37 of each movable end corner abutment 5 there is a projection 40 having teeth 41 which are complementary to the form of the teeth of the rack 29 and adapted to register therewith when the abutment is swung downward about the shaft 31.

Normally, when a car is used for carrying standard size containers, the movable end corner abutments 5 are swung upward and backward to a position such as indicated in broken lines in Fig. V, in which position they are well clear of the normal loading space of the car platform. When, however it is desired to carry containers of less width than the standard size container, the movable end corner abutments are placed in predetermined positions, ascertained by measurement of the containers, so that a pair of such abutments at the end of the car will snugly accommodate the end of one of the containers. The abutments 5 are so spaced at varying distances from the edge of the car by sliding them transversely of the car platform along the shafts 31 and then swinging them forward and downward to register with the teeth of the rack 29. When set in proper spaced relation on the car platform the movable end corner abutments 5 are automatically locked in place by the seating of the containers thereon, the weight of the end containers resting on the base plates 37 of the abutments.

The particular combination of rack and movable end corner abutment described as above represents but one of many forms contemplated by my invention for the seating of the end corners of containers of non-standard base dimensions. Obviously, many forms of notched members other than the particular type of rack 29 here shown may be used for the adjustment of a movable corner abutment.

Having thus described my invention, I claim:

1. In a container carrying vehicle, a platform, a shaft mounted transversely of said platform, a seating abutment for a container slidable along said shaft and rotatable thereon, and means for locking said abutment at different points along the length of said shaft.

2. In a container carrying vehicle, a platform, a rack extending inward from the edge of said platform toward the center line, and a seating abutment for a container corner having a depending projection, said abutment being adapted for sliding movement above said rack and being adapted for swinging movement to cause said depending projection to engage said rack to lock the abutment on said platform.

3. In a container carrying vehicle, a platform, a rack extending inward from the edge of said platform toward the center line, and a seating abutment for a container having a depending projection, said abutment being adapted for sliding movement above said rack and being adapted for swinging movement to cause said depending projection to engage said rack to lock the abutment on said platform.

4. In a container carrying vehicle, a platform, a fixed container seating abutment mounted near the platform edge for engaging a container of predetermined maximum size, a rack extending inward from the edge of said platform toward the center line, and a movable container seating abutment having a depending projection, said movable abutment being adapted for sliding movement above said rack and for swinging movement from a position clear of the seating area of the fixed seating abutment to engage said depending projection with said rack to lock the abutment on said platform.

5. In a container carrying vehicle, a platform, a fixed container seating abutment mounted near the platform edge for engaging a container of predetermined maximum size, a shaft mounted transversely of said platform, a movable container seating abutment slidable along said shaft and rotatable thereabout to swing clear of the seating area of the fixed abutment and means for locking said abutment at different points along the length of said shaft.

SAMUEL H. OWENS.